(12) United States Patent
Colchen et al.

(10) Patent No.: US 9,744,860 B2
(45) Date of Patent: Aug. 29, 2017

(54) ELECTRIC CUT-OFF SAFETY DEVICE

(71) Applicant: RENAULT s.a.s., Boulogne Billancourt (FR)

(72) Inventors: Ludovic Colchen, Voisins-le-Bretonneux (FR); Robert Lassartesses, Versailles (FR)

(73) Assignee: RENAULT s.a.s., Boulogne Billancourt (FR)

( * ) Notice: Subject to any disclaimer, the term of this patent is extended or adjusted under 35 U.S.C. 154(b) by 407 days.

(21) Appl. No.: 14/389,820

(22) PCT Filed: Mar. 26, 2013

(86) PCT No.: PCT/FR2013/050644
§ 371 (c)(1),
(2) Date: Nov. 10, 2014

(87) PCT Pub. No.: WO2013/150218
PCT Pub. Date: Oct. 10, 2013

(65) Prior Publication Data
US 2015/0069835 A1 Mar. 12, 2015

(30) Foreign Application Priority Data
Apr. 3, 2012 (FR) .................... 12 53052

(51) Int. Cl.
*B60L 3/04* (2006.01)
*H01H 85/00* (2006.01)
*H02H 7/18* (2006.01)
*H01H 85/54* (2006.01)
*H01H 85/02* (2006.01)

(52) U.S. Cl.
CPC ............. *B60L 3/04* (2013.01); *H01H 85/545* (2013.01); *H01H 85/547* (2013.01); *H01H 2085/0233* (2013.01)

(58) Field of Classification Search
CPC ...... B60L 3/04; H01H 85/545; H01H 85/547; H01H 2085/0233
USPC ........................................................ 307/10.7
See application file for complete search history.

(56) References Cited

U.S. PATENT DOCUMENTS 5,757,150 A    5/1998  Kinoshita et al.
2005/0098419 A1  5/2005  Matsui et al.

FOREIGN PATENT DOCUMENTS

| DE | 10 2010 001 648 | 8/2011 |
| EP | 0 638 458 | 2/1995 |
| FR | 2 440 067 | 5/1980 |

OTHER PUBLICATIONS

International Search Report Issued Jul. 1, 2013 in PCT/FR13/050644 Filed Mar. 26, 2013.
French Search Report Issued Nov. 27, 2012 in French Patent Application No. 1253052 Filed Apr. 3, 2012.

*Primary Examiner* — Hal Kaplan
(74) *Attorney, Agent, or Firm* — Oblon, McClelland, Maier & Neustadt, L.L.P.

(57) ABSTRACT

An electric cut-off safety device for the power circuits of an electric bipolar vehicle is capable of cutting off two poles. An electric vehicle can include such an electric cut-off safety device.

14 Claims, 8 Drawing Sheets

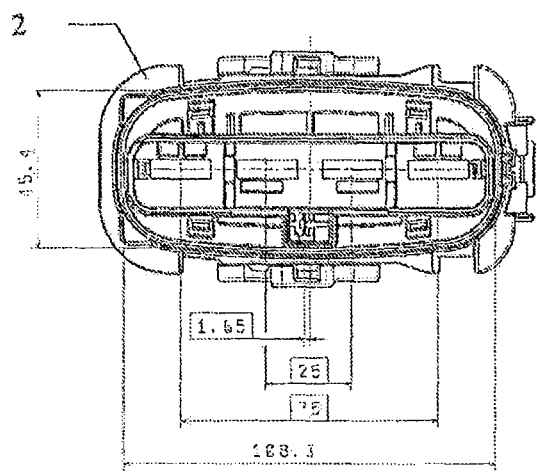
FIG. 11
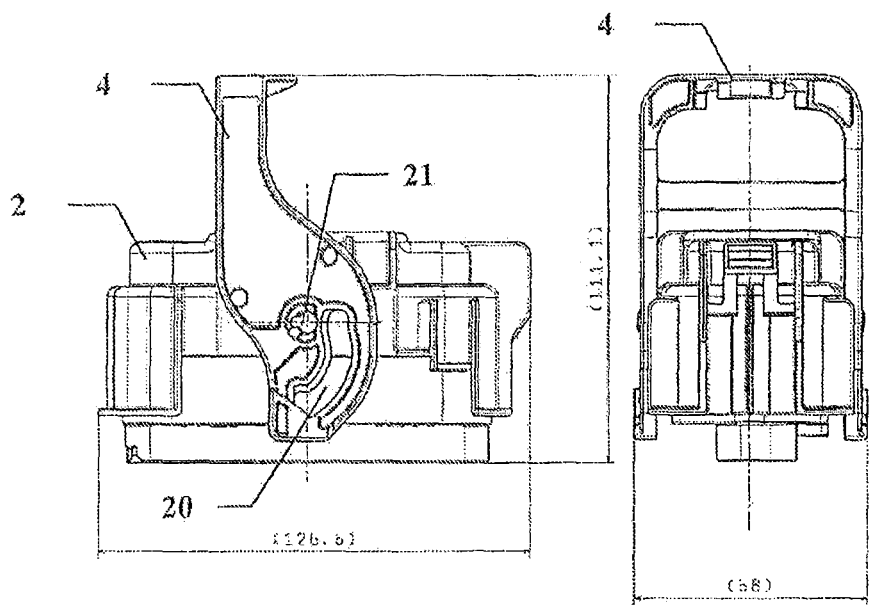
FIG. 12
FIG. 13

ELECTRIC CUT-OFF SAFETY DEVICE

The present invention relates to an electric vehicle, and more particularly to the safety protection of a power battery of such a vehicle by means of an electric cut-off safety device.

An electric cut-off safety device of this type is intended to enable a power battery to be isolated in order to eliminate any current and/or potential difference in all parts of the power circuit, so that work can be carried out on the vehicle without danger, either by the after-sales personnel during after-sales servicing, or by rescue personnel after an accident. It should be noted that, in the case of an accident, the power circuit may have been damaged and may contain additional short circuits.

Figure 1:
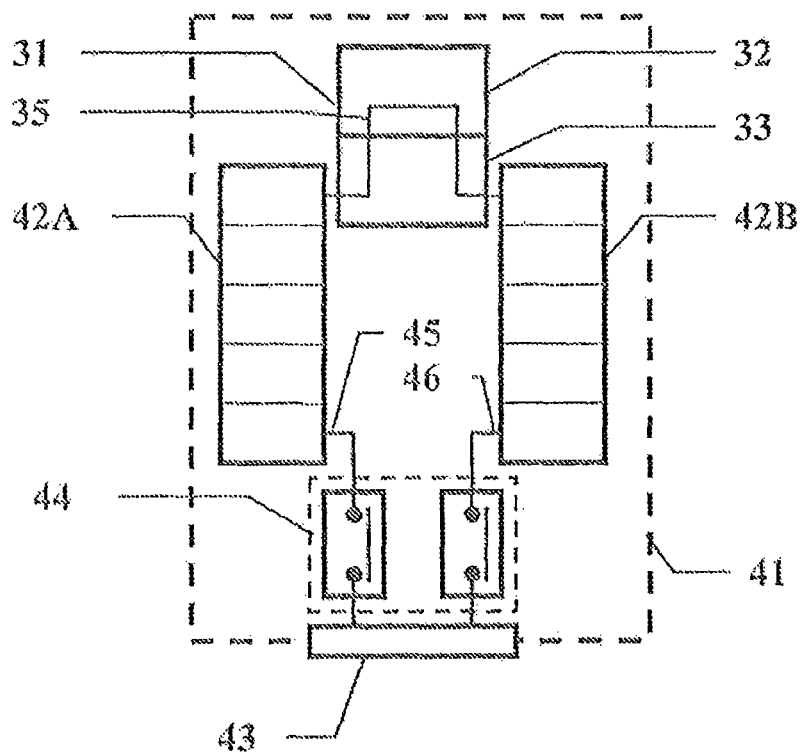

As shown in FIG. 1, a power circuit 41 of an electric vehicle according to the prior art typically comprises a power battery 42, comprising, for example, two half-packs 42A, 42B, a connector 43, a connection relay 44 and an electric cut-off safety device 31. The power circuit 41 may also comprise other components such as fuses (not shown).

The connector 43 enables the power circuit 41 to be connected to the user circuit comprising the motor, or motors, and other elements. This connector 43 allows disconnection for replacing the power circuit assembly 41 and thus the power battery 42, for example.

The electric cut-off safety device 31 enables the power circuit 41 to be opened so as to provide safe access to the battery 42 and to the electric vehicle. For this purpose, an electric cut-off safety device 31 typically comprises a socket 33 into which a plug 32 is placed so as to close an electrical circuit 35. Extracting the plug 32 from the socket 33 removes a part 35 of the power circuit 41, thereby ensuring that the power circuit 41 is electrically open.

The connection relay 44 enables the power circuit 41 to be switched on or off, respectively, by closing or opening at least one contact.

According to the prior art, the electric cut-off safety device 31 is of the single-pole type, since it cuts off only one of the two poles 45, 46 of the power battery 42. The electric cut-off safety device 31 therefore comprises only a single selectively openable circuit 35. The electric cut-off safety device 31 is placed in the power circuit 41, at a first pole 45 of the power battery 42, at a second pole 46 of the power battery 42, or alternatively, as shown in FIG. 1, between the two half-packs 42A, 42B of the power battery 42.

However, this configuration provides only a limited degree of safety downstream of the half-packs 42A, 42B of the power battery 42, and does not ensure the absence of potential difference if there is a cumulative failure of more than one protective barrier.

Thus, in an illustrative situation, if a connection relay 44 is jammed, and if, owing to an accident for example, there is a fault in a battery isolating means which is supposed to isolate the battery 42 from the vehicle chassis, a potential difference may be present between an active part of the defective pole 45, 46 and the vehicle chassis, at any point on the electric vehicle.

Furthermore, this single-pole configuration of the electric cut-off safety device 31 requires a bipolar connection relay 44, as shown in FIG. 1, in order to comply with the regulations currently in force.

The present invention greatly improves safety and ensures the absence of a potential difference in numerous situations, including the case of a failure of the protective barriers.

To this end, the present invention proposes an electric vehicle comprising a power circuit, said circuit comprising a power battery including two half-packs, a connector for connecting the power circuit to an electric motor, and a connection relay for switching the power circuit on or off. The power circuit further comprises a bipolar electric cut-off safety device, arranged so as to be capable of disconnecting both poles of the power battery.

Advantageously, the device may comprise a socket and a removable plug.

In one embodiment, the plug may further comprise at least one main fuse on at least one of the poles. For example, the main fuse may be a fast-acting fuse.

In one embodiment, the plug may comprise a lever for locking it to, and unlocking it from, the socket, the lever being capable of providing effort reduction.

In one embodiment, the vehicle may further comprise a means of testing for the presence of the plug in the socket.

In one embodiment, the electric cut-off safety device may be placed between the power battery and the connector.

In one embodiment, the power circuit may further comprise a secondary fuse, placed near the electric cut-off safety device. For example, the first secondary fuse may be a slow-acting fuse. For example, the first secondary fuse may be placed on a pole not protected by a main fuse.

In one embodiment, the power circuit may further comprise a second secondary fuse, placed between the two half-packs. For example, the second secondary fuse may be a slow-acting fuse.

In one embodiment, the connection relay may be of the single-pole type.

Advantageously, the connection relay may be placed between the two half-packs.

Figure 2:
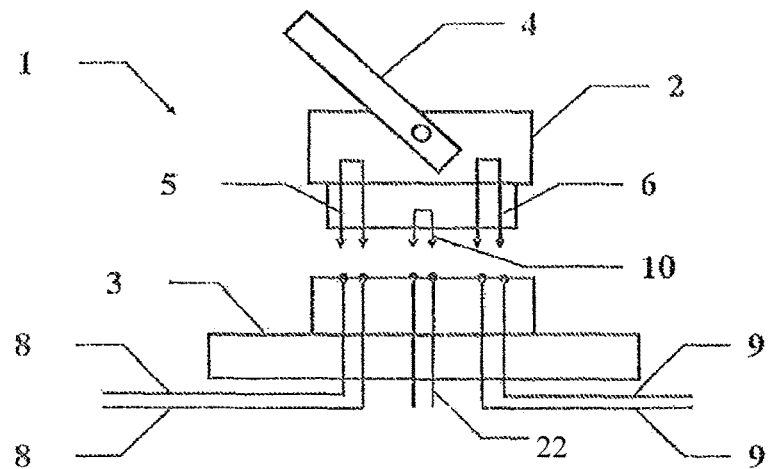
Figure 3:
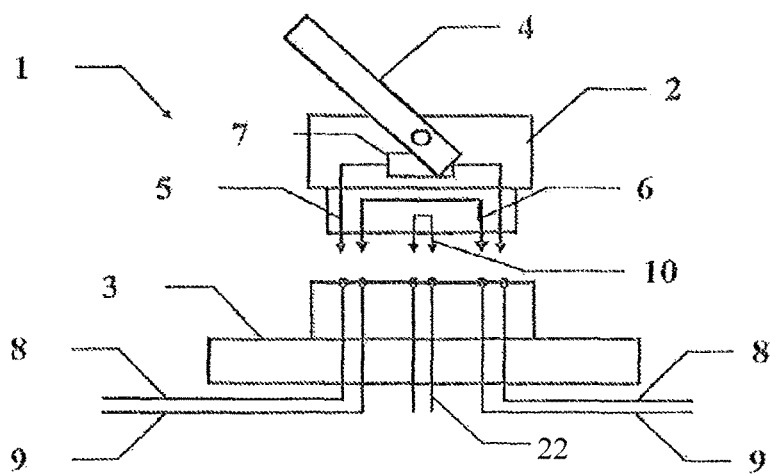
Figure 4:
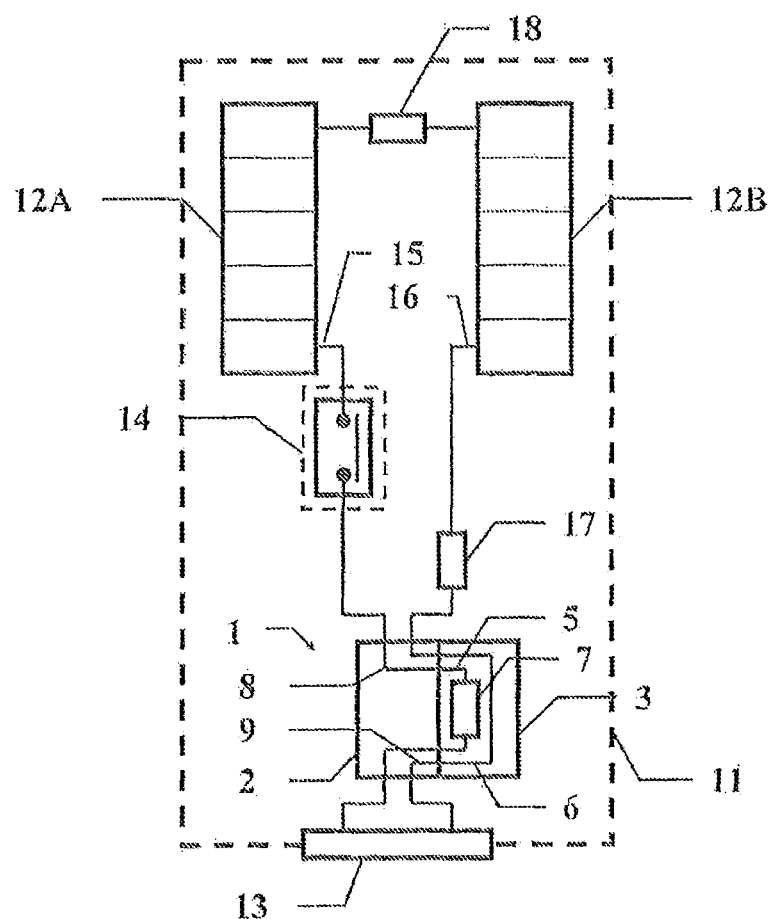
Figure 5:
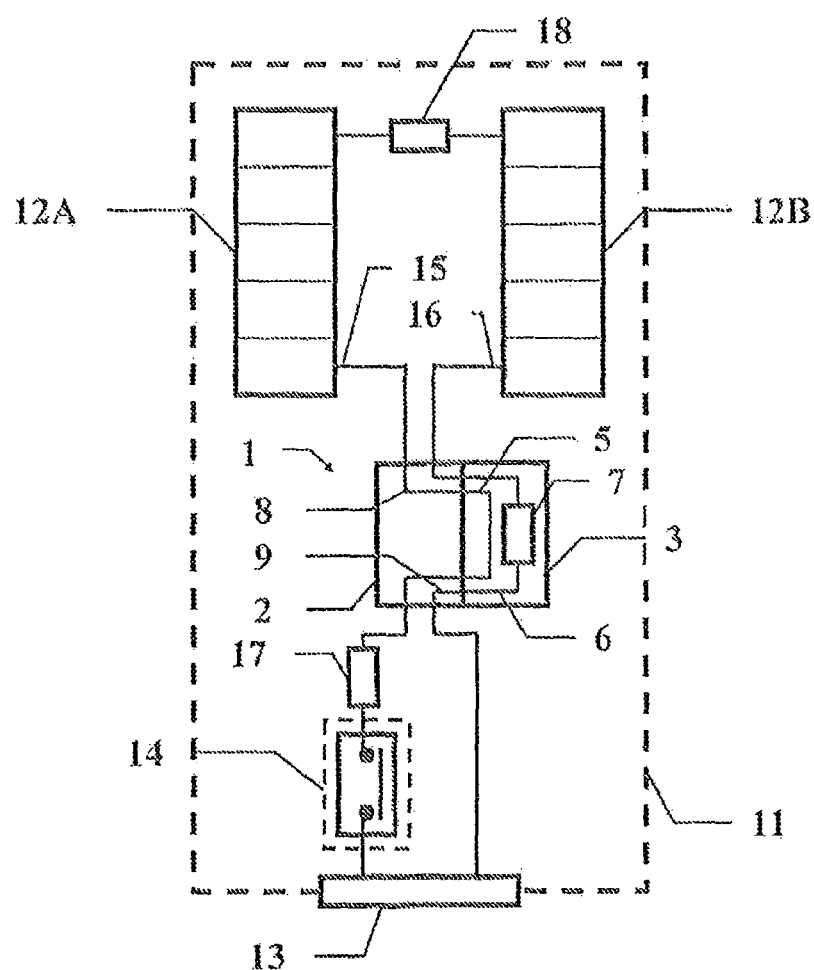
Figure 6:
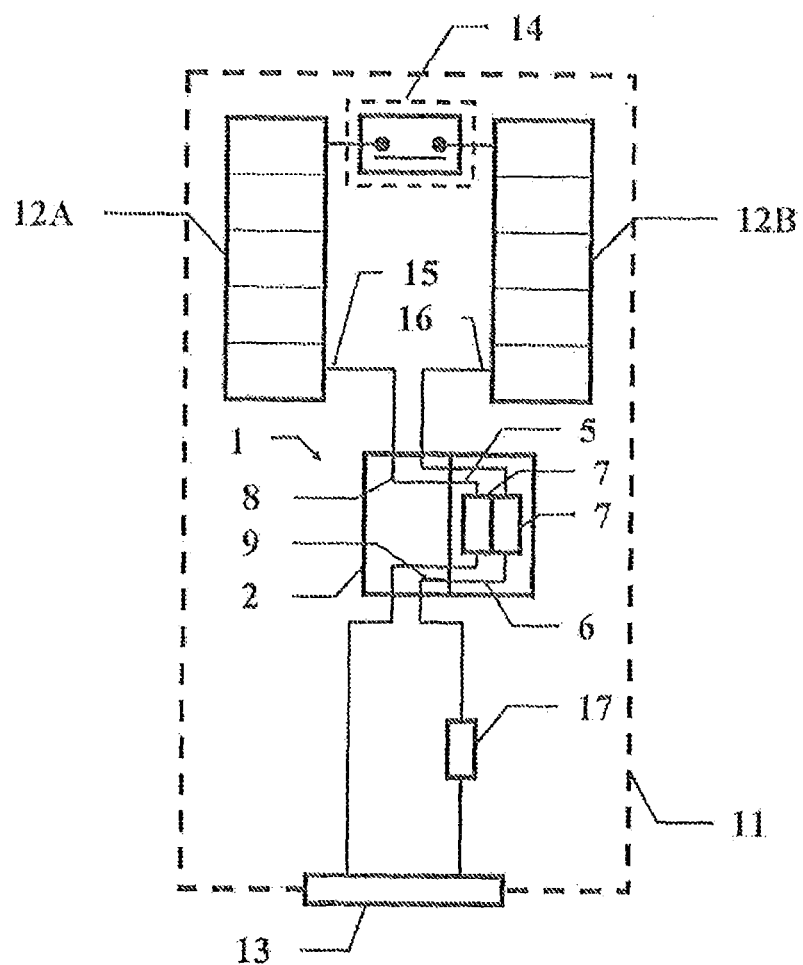
Figure 7:
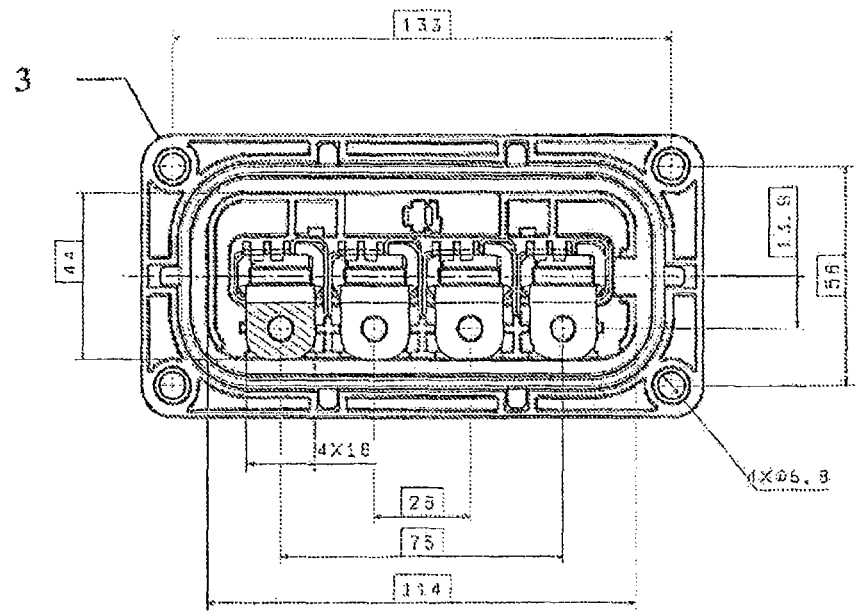
Figure 8:
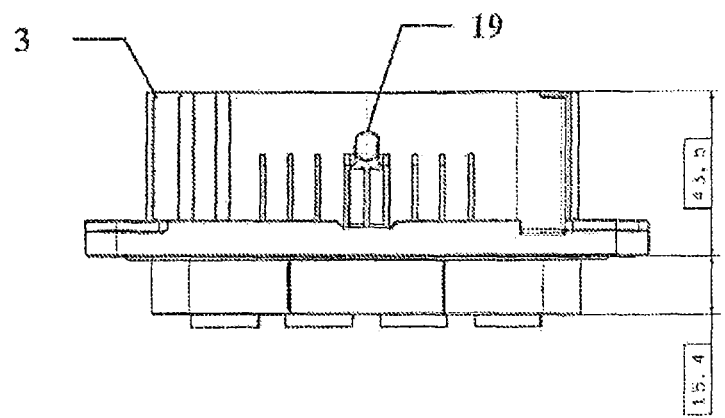
Figure 9:
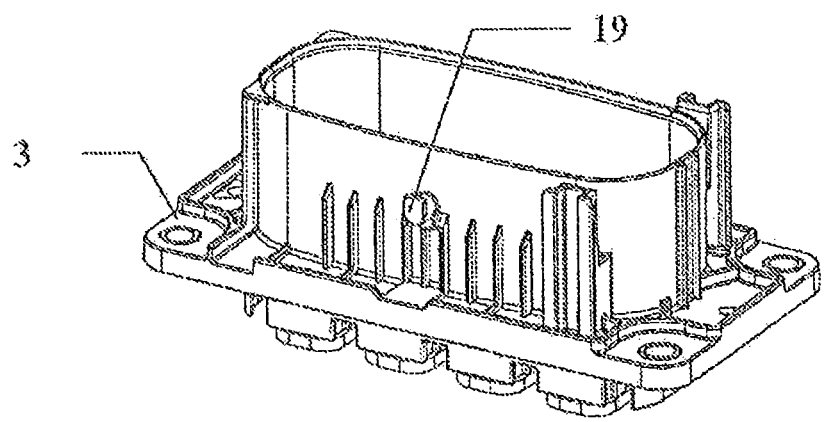
Figure 10:
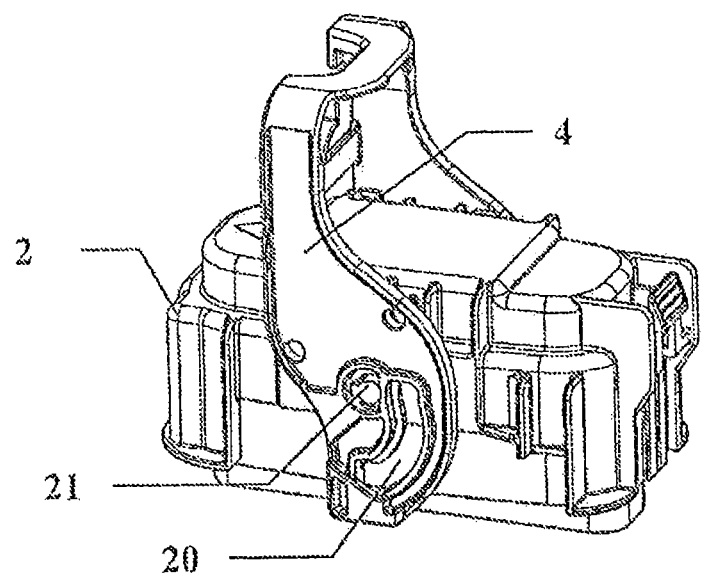

Other characteristics, details and advantages of the invention will be more fully apparent from the following detailed description, provided for guidance only, with reference to the drawings, in which:

FIG. 1, described above, shows a power circuit according to the prior art,

FIG. 2 shows a schematic diagram of an electric cut-off safety device according to a first embodiment, FIG. 3 shows a schematic diagram of an electric cut-off safety device according to a second embodiment, FIG. 4 shows a power circuit according to a first embodiment, FIG. 5 shows a power circuit according to a second embodiment, FIG. 6 shows a power circuit according to a third embodiment, FIGS. 7-8 show a drawing of a socket according to one embodiment, viewed from below in FIG. 7 and viewed in elevation in FIG. 8, FIG. 9 shows the same socket in a perspective view, FIG. 10 shows the plug of FIGS. 11-13 in a perspective view, FIGS. 11-13 show a drawing of a plug according to one embodiment, viewed from below in FIG. 11, viewed from the front in FIG. 12, and viewed from the left in FIG. 13.

According to an important characteristic of the invention, an electric cut-off safety device 1 is bipolar, in that it enables both poles 15, 16 of a battery 12 to be cut off simultaneously.

For this purpose, as shown in FIG. 2 according to a first embodiment, and in FIG. 3 according to a second embodiment, the electric cut-off safety device 1 comprises a first interrupted electrical circuit 8 and a second interrupted electrical circuit 9, together with a first electrical junction circuit 5 and a second electrical junction circuit 6, respectively, which can close said first electrical circuit 8 and second electrical circuit 9, respectively, at their points of interruption.

According to one embodiment, the first interrupted electrical circuit 8 and the second interrupted electrical circuit 9 are placed in a socket 3 of the electric cut-off safety device 1, while the first electrical junction circuit 5 and the second electrical junction circuit 6 are placed in a plug 2 which is complementary to said socket 3 and can be selectively attached to or detached from said socket 3, so as to close or open, respectively, said electrical circuits 8, 9.

FIG. 2 shows an embodiment in which the two poles are connected directly, while FIG. 3 shows an embodiment in which the two poles are crossed over.

According to one embodiment, the plug 2 can remain attached to the socket 3 with restricted mobility, enabling said electrical circuits 8, 9 to be selectively closed or opened.

According to an alternative preferred embodiment, the plug 2 is removable and can be entirely separated from the socket 3. This embodiment is advantageous in that, when the plug 2 is withdrawn and the circuits 8, 9 are open, the plug 2 can be placed at a distance from the socket 3, the power circuit 11 and the electric vehicle. The absence of the plug 2, which comprises a part 5, 6, withdrawn in this way, of each of the two electrical circuits, leaves the two electrical circuits 8, 9 interrupted, and provides a physical assurance that the electrical cut-off is effective and safe.

According to one embodiment, the electric cut-off safety device 1 advantageously comprises a main fuse 7 on at least one of its poles. It can thus comprise two such main fuses 7, each being placed on one of the poles. Each of said at least one main fuse 7 can be placed either in the socket 3 or in the plug 2.

However, according to a preferred embodiment, said at least one main fuse 7 is advantageously placed in the plug 2. Thus, if this plug 2 is removable, the plug 2 together with said at least one main fuse 7 form an easily replaceable unit for maintenance purposes. Said at least one main fuse 7 can thus be replaced by replacing the plug 2 with a new plug 2.

According to one embodiment, the electric cut-off safety device 1 advantageously comprises a locking/unlocking means so as to ensure that the plug 2 is correctly retained in the socket 3, regardless of any vibrations and shocks transmitted by the electric vehicle to the electric cut-off safety device 1.

According to an advantageous embodiment, the electric cut-off safety device 1 further comprises a first effort reduction means adapted to assist the insertion of the plug 2 into the socket 3 with a reduced insertion effort.

According to an advantageous embodiment, the electric cut-off safety device 1 further comprises a second effort reduction means adapted to assist the extraction of the plug 2 from the socket 3 with a reduced insertion effort.

The locking means, the unlocking means, the first insertion effort reduction means and the second extraction effort reduction means can advantageously be combined and made in the form of a lever 4, attached to the plug 2 for example, which interacts with at least one lug 19 placed facing it and attached to the socket 3.

This embodiment is shown more fully in FIGS. 9 and 10. The lever 4 is pivoted about an axis of rotation 21 relative to the plug 2. It comprises a channel 20 having a substantially spiral shape and adapted to engage a lug 19 attached to the socket 3 when the plug 2 is placed facing the socket 3.

During insertion and locking, the lever 4 is initially in the vertical position relative to the figure. In this position, the channel 20 has an opening allowing the lug 19 to be engaged. The lever 4 is then maneuvered so as to cause a clockwise rotation about the axis of rotation 21 in order to reach a horizontal position relative to the figure. When this is done, a first contour of the channel 20, namely the contour located in the lower position in the figure, comes into contact with said lug 19. This creates a reduction of effort, facilitating the insertion of the plug 2 into the socket 3. During this clockwise rotation, the spiral shape of the channel 20 tends to move the lug 19 toward the axis of rotation 21. At the end of said rotation, the same contour, still in contact with the lug 19, locks the assembly consisting of the plug 2 and the socket 3.

During unlocking and extraction, the lever 4 is initially in the horizontal position relative to the figure. It is then maneuvered so as to cause an anticlockwise rotation about the axis of rotation 21 in order to reach a vertical position relative to the figure. When this is done, the second contour of the channel 20, namely the contour located in the upper position in the figure, comes into contact with said lug 19. This pressure creates a reduction of effort, facilitating the extraction of the plug 2 from the socket 3. During this anticlockwise rotation, the spiral shape of the channel 20 tends to move the lug 19 away from the axis of rotation 21. At the end of said rotation, the lug 19 is located facing said opening in the channel 20, and can be disengaged to separate the plug 2 from the socket 3.

The combination of the locking means, the unlocking means, the first effort reduction means for insertion and the second effort reduction means for extraction advantageously enables the insertion and extraction operations to be simplified. This is because a single maneuver of the lever 4 enables insertion and locking, or unlocking and extraction, to take place simultaneously.

The extraction effort reduction means is particularly useful for providing an opportunity for electrical cut-off, whether or not the current is flowing. In this case, an extraction effort is found to be about 24 daN. An effort reduction means using a lever 4, as described above, advantageously enables this effort to be reduced to a quarter, that is to say 6 daN, which is more acceptable in terms of convenience for the user.

The whole body of the electric cut-off safety device 1, with the exception of the electrical parts, namely the fuse(s) 7 and the circuits 5, 6, 8, 9 of the plug and the socket, is advantageously molded from plastic. In order to withstand the high temperatures that may be created by the flow of current, this plastic is advantageously reinforced with fibers.

Said at least one main fuse 7 provided in the electric cut-off safety device 1 is advantageously a fast-acting fuse. In this case, the fuse is considered to be fast-acting relative to the other secondary fuses 17, 18 which may be provided in the power circuit 11. Thus, if there is competition between a main fuse 7 and a secondary fuse 17, 18, one of the at least one main fuses 7 will blow first. This is particularly advantageous in configurations in which said at least one main fuse 7 is more easily replaceable.

According to one embodiment, the electric cut-off safety device 1 further comprises a means 10, 22 for testing for the presence of the plug 2 in the socket 3.

This can be provided by an electrical circuit 10, 22 which is interrupted when the plug 2 is withdrawn from the socket 3. Said electrical circuit 10, 22 comprises a part 10 attached to the plug 2, which closes an interrupted part 20 attached to the socket 3 when the plug 2 is inserted into the socket 3. Thus the presence of the plug 2 in the socket 3 can be tested for electrically, by any means capable of selectively detecting the opening or closing of said electrical circuit 10, 22.

The invention further relates to the use of an electric cut-off safety device 1 according to any of the preceding embodiments in an electric vehicle.

As shown in FIGS. 4-6, a power circuit 11 of an electric vehicle according to the invention typically comprises a power battery 12, comprising, for example, two half-packs 12A, 12B, a connector 13, a connection relay 14 and an electric cut-off safety device 1. The power circuit 11 may optionally comprise other components such as fuses 7, 17, 18.

The connector 13 enables the power circuit 11 to be connected to the user circuit comprising the motor, or motors, and other elements. This connector 13 allows disconnection for replacing the power circuit assembly 11 and thus the power battery 12, for example.

The electric cut-off safety device 1 enables the power circuit 11 to be opened so as to provide safe access to the battery 12 and to the electric vehicle.

The connection relay 14 enables the power circuit 11 to be switched on or off, respectively, by closing or opening at least one contact.

According to the invention, the electric cut-off safety device 1 is bipolar and comprises two poles 5, 6, 8, 9 that can be selectively opened or closed. The electric cut-off safety device 1 is arranged so as to cut off both poles 15, 16 of the power battery 12, as shown in FIGS. 4-6.

This configuration, cutting off both poles 15, 16 of the power battery 12, provides improved safety downstream of the half-packs 12A, 12B of the power battery 12, and ensures the absence of potential difference in a greater number of failure situations, including cases in which there is a cumulative failure of more than one protective barrier.

The electric cut-off safety device 1 may be placed downstream of the connector 13. However, in a preferred arrangement, the electric cut-off safety device 1 is placed between the power battery 12 and the connector 13. Thus it is ensured that both poles 15, 16 of the power battery 12 can be cut off. This arrangement, nearer to the power battery 12, is more secure, in that it avoids the presence of long stretches of electrical circuit between the power battery 12 and the electric cut-off safety device 1, thus eliminating a number of possibilities of a short-circuit.

To improve the protection in failure situations, including complex situations, the power circuit 11 may be supplemented by at least a first secondary fuse 17.

This first secondary fuse 17 can be placed near the electric cut-off safety device 1, either upstream, as shown in FIG. 4, or downstream, as shown in FIGS. 5 and 6.

Said at least one first secondary fuse 17 is advantageously a slow-acting fuse. In this case, the fuse is considered to be slow-acting relative to said at least one main fuse 7. Thus, if there is competition between a main fuse 7 and a secondary fuse 17, 18, one of the at least one main fuses 7 will blow first.

In a preferred embodiment, said first secondary fuse 17 is placed on a pole 15, 16 not protected by a main fuse 7. Thus, in FIG. 4, a single main fuse 7 protects the pole 15 of the power battery 12. The first secondary fuse 17 is then advantageously positioned so as to protect the other pole 16 of the power battery 12.

Conversely, in FIG. 5, a single main fuse 7 protects the pole 16 of the power battery 12. The first secondary fuse 17 is then advantageously positioned so as to protect the other pole 15 of the power battery 12. FIG. 6 shows an embodiment comprising two main fuses 7 protecting each of the poles 15, 16 of the power battery 12. This does not rule out the use of redundant protection provided by a first secondary fuse 17, placed on pole 16 of the power battery 12 in this case.

According to one embodiment, the power battery 12 is composed of at least two half-packs 12A, 12B. In this case, the power circuit 11 may further comprise a second secondary fuse 18, advantageously placed between the two half-packs 12A, 12B. This arrangement opposite the poles 15, 16 is shown in FIGS. 4 and 5.

Said at least one second secondary fuse 18 is advantageously a slow-acting fuse. In this case, the fuse is considered to be slow-acting relative to said at least one main fuse 7. Thus, if there is competition between a main fuse 7 and a secondary fuse 17, 18, one of the at least one main fuses 7 will blow first.

According to the regulations in force concerning electric vehicles, it must be possible to cut off both poles 15, 16 of the power battery 12. In the case of a single-pole electric cut-off safety device 31 according to the prior art, a bipolar connection relay 44 would have to be used. Because the electric cut-off safety device 1 according to the invention is bipolar, a single-pole connection relay 14 can advantageously be used, as shown in FIGS. 4-6. A single-pole connection relay 14 of this type can perform its function of controllable switching on or off by acting on a single pole 15, 16.

A single-pole connection relay 14 of this type can be placed in the power circuit 11 either on pole 15 or on the other pole 16.

Similarly, the connection relay 14 can be placed, in relation to the electric cut-off safety device 1, either upstream, as shown in FIG. 4, or downstream, as shown in FIG. 5.

In one embodiment in which the power battery 12 is composed of at least two half-packs 12A, 12B, the connection relay 14 can also be placed between the two half-packs 12A, 12B, as shown in FIG. 6.

FIGS. 7-8 and 11-13, respectively, show, in dimensioned drawings, a possible embodiment of a socket 3 and of a plug 2, respectively, which together form an electric cut-off safety device 1. The dimensions and proportions are given for guidance only.

The invention claimed is:

1. An electric vehicle comprising a power circuit, said circuit comprising a power battery including two half-packs, a connector for connecting the power circuit to an electric motor of said vehicle, and a connection relay for switching the power circuit on or off, the vehicle being characterized in that the power circuit further comprises a bipolar electric cut-off safety device arranged so as to be capable of disconnecting both poles of the power battery.

2. The vehicle as claimed in claim 1, the device comprising a socket and a removable plug.

3. The vehicle as claimed in claim 2, wherein said plug further comprises at least one main fuse on at least one of the poles.

4. The vehicle as claimed in claim 3, wherein said at least one main fuse is a fast-acting fuse.

5. The vehicle as claimed in claim 2, wherein said plug comprises a lever for locking to and unlocking from the socket, the lever being capable of providing effort reduction.

6. The vehicle as claimed in claim 2, further comprising a means for testing for the presence of the plug in the socket.

7. The vehicle as claimed in claim 3, wherein the power circuit further comprises a first secondary fuse, placed near the electric cut-off safety device.

8. The vehicle as claimed in claim 7, wherein said first secondary fuse is a slow-acting fuse.

9. The vehicle as claimed in claim 7, wherein said first secondary fuse is placed on a pole not protected by a main fuse.

10. The vehicle as claimed in claim 7, the power circuit further comprising a second secondary fuse, placed between the two half-packs.

11. The vehicle as claimed in claim 10, wherein said second secondary fuse is a slow-acting fuse.

12. The vehicle as claimed in claim 1, wherein the electric cut-off safety device is placed between the power battery and the connector.

13. The vehicle as claimed in claim 1, wherein the connection relay is of the single-pole type.

14. The electric vehicle as claimed in claim 1, wherein the connection relay is placed between the two half-packs.

* * * * *